United States Patent [19]
Boffelli

[11] Patent Number: 4,775,041
[45] Date of Patent: * Oct. 4, 1988

[54] COMPACT FRICTION CLUTCH WITH ACTUATED DISENGAGEMENT, SUITABLE FOR VEHICLE COMPRESSORS

[75] Inventor: Pier C. Boffelli, San Donato Milanese, Italy

[73] Assignee: Baruffaldi FRizioni S.p.A., San Donato Milanese, Italy

[*] Notice: The portion of the term of this patent subsequent to Apr. 14, 2004 has been disclaimed.

[21] Appl. No.: 942,551

[22] Filed: Dec. 16, 1986

[30] Foreign Application Priority Data

Dec. 16, 1985 [IT] Italy .................................. 36434/85[U]

[51] Int. Cl.⁴ ..................... F16D 25/063; F16D 25/08
[52] U.S. Cl. ........................... 192/70.27; 192/85 CA; 192/91 A

[58] Field of Search ............. 192/91 A, 70.27, 85 CA, 192/85 AA, 91 R; 188/170

[56] References Cited

U.S. PATENT DOCUMENTS

| 2,709,926 | 6/1955 | Jandasek | 192/91 A |
| 3,893,556 | 7/1975 | Lech, Jr. et al. | 192/91 A |
| 4,648,805 | 3/1987 | Beaumont | 192/85 AA |
| 4,657,127 | 4/1987 | Boffelli | 192/70.27 |

Primary Examiner—Leslie A. Braun
Assistant Examiner—David A. Testardi
Attorney, Agent, or Firm—Herbert Dubno

[57] ABSTRACT

A compact friction clutch for a compressor in which both the driving hub and the driven hub are mounted on the compressor shaft external of the compressor housing and a piston recessed in an end wall of the housing bears upon the bell controlling the clutch-disk stack to relieve the clutch applying force of a spring.

6 Claims, 2 Drawing Sheets

COMPACT FRICTION CLUTCH WITH ACTUATED DISENGAGEMENT, SUITABLE FOR VEHICLE COMPRESSORS

FIELD OF THE INVENTION

The present invention relates to a compact friction clutch with actuated disengagement, suitable for coupling to compressors of vehicles and the like, and having a minimal size and weight.

BACKGROUND OF THE INVENTION

Braking systems and other systems of heavy vehicles are usually constructed for pneumatic actuation, and a compressor is provided for supplying the necessary pressure for correct functioning, of these systems this compressor being driven by the vehicle engine through transmission devices.

For economy in operation, it is advantageous to regulate the maximum pressure in the pneumatic circuit for supplying such systems by interrupting the functioning of the compressor, that is to say disengaging the connection between it and the engine and therefore permitting it to stop as long as sufficient pressure for the correct functioning of the supply equipment is maintained in the pneumatic circuit, and again engaging driving the compressor not later than when the pressure in the circuit falls below a predetermined value.

This arrangement, as compared with an approach which provides a continuously running compressor and a limiting valve, which periodically discharges the excess pressure from the circuit, permits the load on the engine to be limited to that which is necessary solely for the compressed air demand, with appreciable economy of operation.

For this purpose, compressors have been equipped with friction clutches for connection to the transmission. However, designs of this type are very bulky and complicated in construction and thus of high cost.

In fact, in the known constructions, a piston is provided in a fixed housing and acts against a rotating member to cause the disengagement of the friction clutch; in order to prevent, at the instant of contact between piston and rotating member, the piston itself from being in rotation, the piston is equipped with rotational blocking means in its housing and elements are interposed between the piston and rotating member, such as thrust blocks, rings of hard material or low friction and the like, to prevent slip between the piston and the rotating member or between the piston and its housing.

Such designs are complex and consequently costly, and the problem therefore arises of providing a friction clutch which reduces to the minimum the number of component parts and eliminates those parts that are unnecessary for its correct functioning, the clutch therefore being of reduced bulk.

There has already been proposed, by the present applicant, a compact friction clutch having a reduced number of component parts and a piston free in its seating, the clutch being equipped with an external casing for supporting the outgoing shaft, which therefore constitutes a further bulky member for the structure, see U.S. Pat. No. 4,657,127, the application of which was copending herewith.

OBJECT OF THE INVENTION

It is the object of the present invention to provide a further improvement in such clutches.

SUMMARY OF THE INVENTION

This object is achieved by the present invention, which provides a compact friction clutch with actuated disengagement, suitable for vehicle compressors, which has a driven hub capable of being keyed onto the shaft of a compressor, on which there is mounted a driving hub, freely rotating, equipped with motive transmission devices connected to an engine, in which the driven hub is equipped with an externally toothed flange rotatably coupled to an axially moveable bell, with which the externally toothed discs for the multi-disc friction clutch are rotatably engaged. The internally toothed discs of the dish stack rotatably engage with a corresponding set of teeth of the driving hub. Elastic means is interposed between the toothed flange and the bell, acting to compress the stack of discs of the clutch assembly with a sufficient force for transmitting by friction the driving torque for operating the compressor from the driving hub to the driven hub. An annular seat is provided in a housing for an annular piston freely rotating and axially moveable inside the annular seat. The piston is equipped with sealing gaskets forming the boundary to a chamber in the seat. Pressurized fluid can be supplied to this chamber for axial displacement of the piston to bring its head into direct engagement with the bell against the force of the elastic means, reducing or cancelling out the force of said elastic means applied to the clutch assembly and permitting the free rotation of the driven hub relative to the driving hub.

With advantage, in order to obtain maximum compactness, the seat of the annular piston is formed inside the external casing of the compressor; the annular piston is housed in its seat with radial play, between annular seals.

More specifically, in the friction clutch according to an embodiment of this invention, the piston has a head surface without any facing materials different from the body of the piston itself, which surface acts directly against the bell, without intermediate elements. The piston is freely rotatable in its seat. The transmission devices connected to the driving hub can include a gear, capable of being coupled to a corresponding gear of a motor member integral with the driving hub itself; in this case, the clutch assembly is designed for operating in oil.

Alternatively, the transmission devices connected to the driving hub may be composed of a belt and pulley transmission, the pulley being keyed to the driving hub; the clutch assembly in this latter case is designed for dry running.

BRIEF DESCRIPTION OF THE DRAWING

More details can be obtained from the following description, given by way of example with reference to the attached drawing, in which.

SPECIFIC DESCRIPTION

Figure 1:
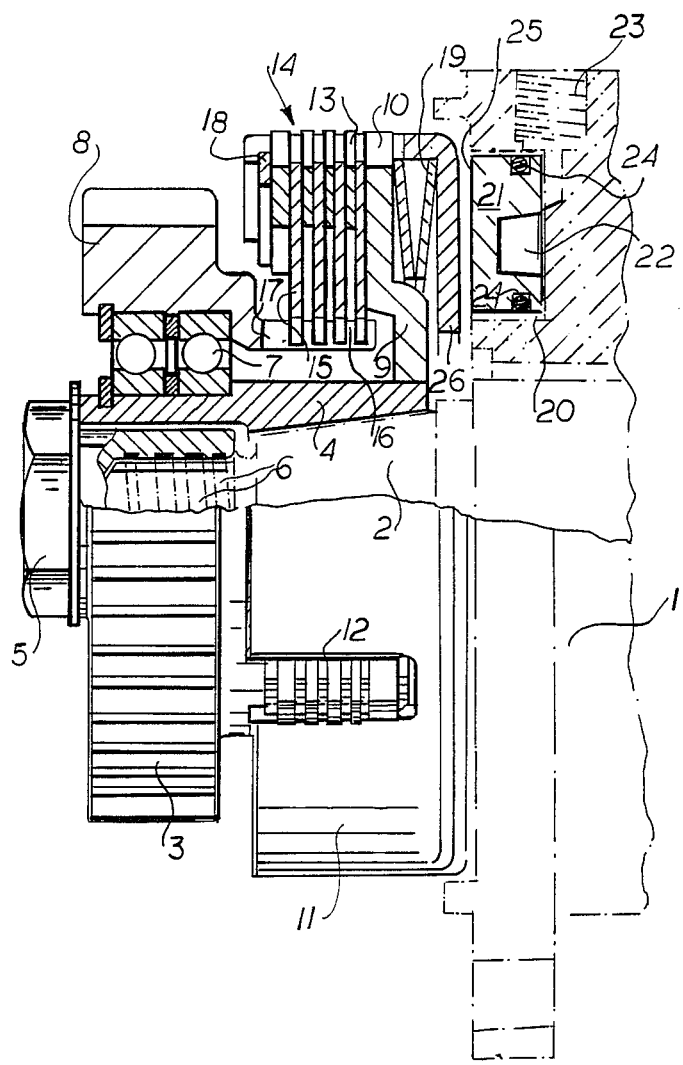
FIG. 1 shows a clutch according to one emodiment of this invention, partly in section, for running in oil and, with a gear transmission.

As can be seen from FIG. 1, a compressor 1, indicated in dot-and-dash line, has a shaft 2 which is connected, via the clutch, to the gear 3, through which the compressor is coupled to the engine of the vehicle on which it is mounted. The friction clutch comprises a driven hub 4, keyed onto the shaft 2 of the compressor, and axially locked by means of the threaded nut 5 screwed onto the end 6 of the shaft.

On the driven hub 4 there is mounted, by ball bearings 7 or similar support means, the gear 8 for connection to the means for transmitting movement to the compressor (e.g. the engine).

On the driven hub 4 a flange 9 is fixed, externally equipped with a set of teeth 10 adapted for engaging a bell 11, the bell being equipped with grooves 12 and free to slide axially.

The grooves 12 of the bell 11, also engage the externally toothed discs 13 of a clutch or plate-stack assembly 14, this clutch assembly possessing internally grooved discs 15 rotatably coupled to the set of teeth 16 of the extension of the hub 17 of the gear 8 reaching into the bell; the clutch assembly is blocked at the free end of the bell 11 by a blocking ring 18.

Between the bell 11 and the toothed flange 9 there are interposed elastic loading means such as, for example as shown, the cup springs 19, which, in cooperation with the blocking ring 18, keep the clutch assembly 14 compressed with an axial load sufficient for transmitting the driving torque for the compressor by friction through discs 13 and 15.

Inside the external casing of the compressor 1 or in an auxiliary element connected to same, there is formed the seat 20 for an annular piston 21, which defines inside itself and the seat an annular chamber 22 equipped with a connection 23 for the supply of actuating fluid; sealing between the annular piston 21 and the walls of the seating 20 is ensured by the toroidal gaskets 24.

A clearance exists between the lateral surfaces of the piston 21 and the walls of its seating 20, and the gaskets 24 are designed to prevent any accidental contact between these surfaces under any circumstances, thus leaving the piston 21 free to move in all its movements, both in the axial and in the rotational directions.

The piston 21 possesses a head surface 25 facing towards the internal flange 26 of the bell 11.

When the chamber 22 is unpressurized, the friction clutch according to the present invention remains in the engaged position, the friction clutch assembly 14 being clamped by means of the springs 19; disengagement of the clutch is carried out by supplying fluid pressure into the chamber 22 via the connection 23, causing the piston 21 to advance and to bear against the internal flange 26 of the bell 11, in opposition to the springs 19, thereby cancelling out the load applied to the bell by the springs themselves, so as to permit free relative rotation between the discs of the friction clutch assembly or to stop the compressor.

In the disengagement stage, when the piston 21 comes into contact with the bell 11, the piston is set in rotation by the bell, and can slip through a small angle between the seals 24 and the walls of the seating 20 before the compressor stops. Slip can also take place between the surface of the piston and the bell.

This rotation is of a fairly small amount, amounting to a fraction of one complete revolution under normal operating conditions, in view of the internal friction values and the compressive resistance, which cause the compressor to stop when the driving torque is disengaged from it.

These slip movements, in particular due to their small values, do not cause any damage to the surfaces involved, either when the slip takes place between the front face of the piston 25 and the flange 26, or in the case where it occurs between the gaskets 24 and the side walls of the piston and its seat.

For this reason, the incorporation of special elements between the piston and the bell is unnecessary, so that a friction clutch of a particularly simple and compact construction can thereby be constructed.

Figure 2:
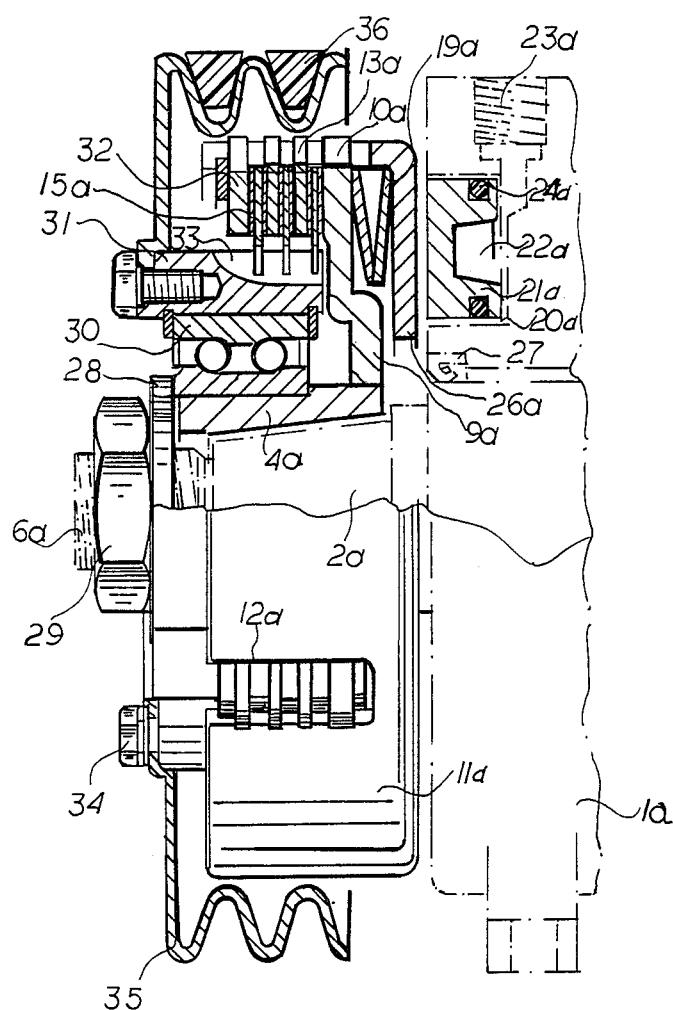
FIG. 2 shows a the clutch according to another embodiment of this invention, partly in section, for dry running, with a belt transmission.

FIG. 2 illustrates the friction clutch in its embodiment intended for operating in dry-running, with transmission by means of belts.

In this embodiment, the compressor 1a is equipped with a driving shaft 2a, on which a seal against the external environment is formed, for example by means of a gasket 27.

On the shaft 2a there is keyed the driven hub 4a, axially locked onto it by means of the bearing disc 28 and the nut 29, screwed onto the threaded end 6a of the shaft, a rotating support 30 being mounted on the driven hub and carrying in turn the driving hub 31.

A flange 9a is fixed onto the driven hub 4a and is rotatably coupled, by means of its set of teeth 10a, to the bell 11a, the bell being equipped with grooves 12a receiving the externally toothed discs 13a of the friction clutch assembly, designed for dry running.

The clutch assembly comprises, in addition, the internally toothed discs 15a, equipped with a surface coating of a friction material 32; a blocking ring similar to ring 18 holds the friction clutch assembly at the end of the bell.

The internally toothed discs 15a engage with the set of teeth 33 of the driving hub 31, while the springs 19a are interposed between the bell 11a and the toothed flange 9a.

Inside the external casing of the compressor, there is formed a seat 20a for the annular piston 21a, defining chamber 22a supplied with pressurized fluid via a connection 23a equipped with a toroidal gasket 24a, all analogous to the embodiment of FIG. 1.

A pulley 35 is attached by means of screws 34 to the driving hub 31, the pulley being adapted for receiving one or more transmission belts 36, for example of trapezoidal section as illustrated.

The functioning of the dry-running friction clutch is in every way analogous to that of the oil-immersed clutch already described, by the separation of the discs of the clutch by the direct action of the annular piston 21a on the bell 11a, without the interposition of any intermediate members between the front face of the piston and the flange 26a of the bell, the piston being free to rotate in its seating.

The structure of the friction clutch, in its embodiment for belt driving, is especially compact, the line of action of the transverse force caused by the pull of the belts being substantially in the same position as that which would exist in the case of a pulley directly keyed onto the shaft 2a, so that the loads acting upon the support members of the shaft 2a present in the compressor are not increased.

The friction clutch according to this invention, in both the embodiments described, is of a fairly simply construction, with a reduced number of component parts, and ensures high reliability in operation, without demanding the provision of devices for blocking the rotation of the piston or of elements interposed between the piston and the bell.

I claim:

1. A friction clutch for a compressor, comprising, in combination with a compressor having a compressor housing having an end portion and a compressor shaft extending from said end portion, a clutch assembly including:
- a driven hub keyed to and receiving said shaft, said hub being provided on an axial end thereof proximal to said housing with an outwardly extending externally toothed flange;
- an axially moveable bell having axially extending grooves along an outer periphery thereof, an inwardly extending annular flange interposed between said outwardly extending flange and said end portion of said compressor housing, and a ring at an axial end of said bell remote from said inwardly extending flange, said outwardly extending flange having teeth engaging in said grooves;
- a clutch-disk stack received between said outwardly extending flange and said ring and having externally toothed disks engaging said grooves and internally toothed disks interleaved with said externally toothed disks;
- a driving hub rotatably mounted on and axially fixed to said driven hub, surrounding said driven hub and said shaft and formed with means connectable to a drive for said compressor for driving said compressor, said driving hub having an extension reaching axially into said bell and formed with grooves engaged by teeth of said internally toothed disks whereby said internally toothed disks are axially shiftable on said driving hub but rotationally coupled thereto;
- elastic means interposed between said flanges for applying to said stack an axial force between said outwardly extending flange and said ring sufficient to bring said internally toothed and externally toothed disks into frictional engagement to enable transfer of compressor-driving torque from said driving hub to said driven hub and said shaft; and
- means for relieving said force to permit free rotation of said driving hub relative to said driven hub.

2. The friction clutch defined in claim 1, wherein said means for relieving said force includes:
- means forming an axially open annular piston-seating recess in said end portion confronting said inwardly extending flange;
- an annular piston received in said recess with internal and external clearance and at least limitedly rotatable in said recess;
- respective gaskets spanning said clearances and sealing a chamber defined by said piston in said recess, said piston having a surface directly juxtaposed with said inwardly extending flange; and
- means for pressurizing said chamber with a fluid to cause said piston to bear upon said inwardly extending flange to shift said bell axially and relieve the force of said elastic means on said stack so as to permit free rotation of the driving hub relative to the driven hub while said piston is limitedly rotated by its frictional engagement with said inwardly extending flange.

3. The friction clutch defined in claim 1 wherein said means connectable to a drive includes a belt pulley extending over and at least partly surrounding said said bell.

4. The friction clutch defined in claim 3, wherein said means for relieving said force includes:
- means forming an axially open annular piston-seating recess in said end portion confronting said inwardly extending flange;
- an annular piston received in said recess with internal and external clearance and at least limitedly rotatable in said recess;
- respective gaskets spanning said clearances and sealing a chamber defined by said piston in said recess, said piston having a surface directly juxtaposed with said inwardly extending flange; and
- means for pressurizing said chamber with a fluid to cause said piston to bear upon said inwardly extending flange to shift said bell axially and relieve the force of said elastic means on said stack so as to permit free rotation of the driving hub relative to the driven hub while said piston is limitedly rotated by its frictional engagement with said inwardly extending flange.

5. The friction clutch defined in claim 1 in which the means connectable to a drive include a gear, capable of being coupled to a corresponding gear of a motor device, integral with the driving hub itself, the stack being designed for operating in oil.

6. The friction clutch defined in claim 1 in which the means connectable to a drive includes a pulley for belt transmission, fixed to the driving hub, the stack being designed for dry running.

* * * * *